Oct. 19, 1937.  C. B. SPASE  2,096,365
CLUTCH WITH METAL FACES
Filed Oct. 21, 1935  2 Sheets-Sheet 2
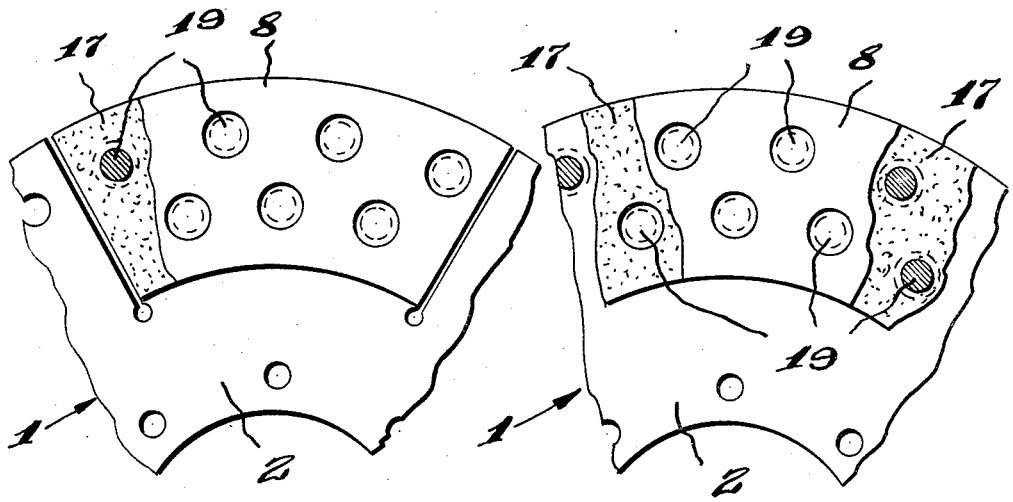
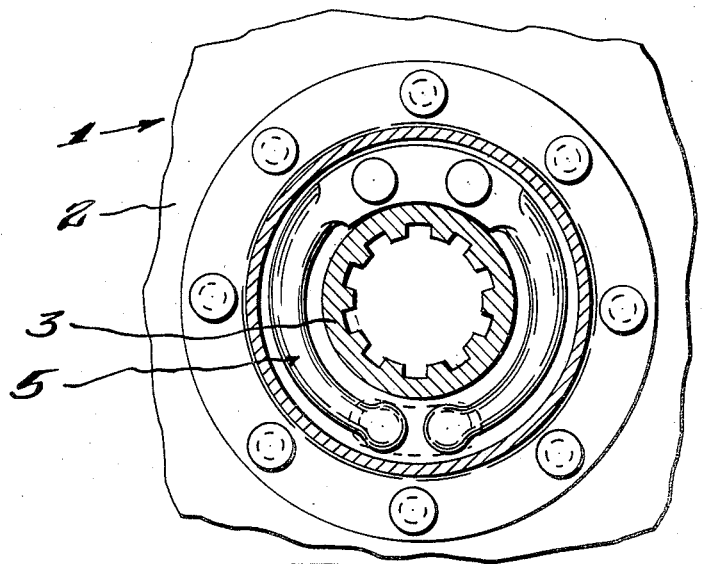

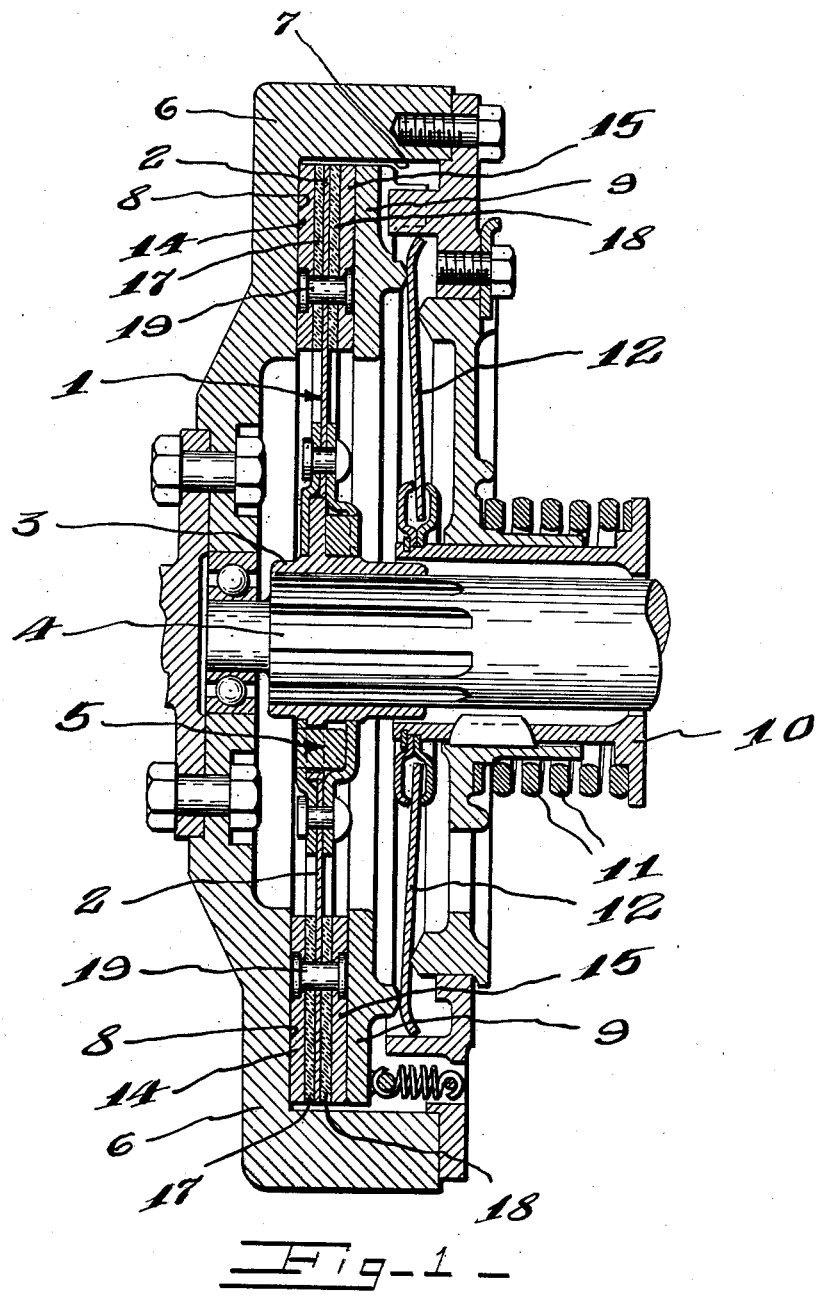

Patented Oct. 19, 1937

2,096,365

UNITED STATES PATENT OFFICE 2,096,365

CLUTCH WITH METAL FACES

Charles B. Spase, Nedrow, N. Y., assignor to W. C. Lipe Inc., Syracuse, N. Y., a corporation of New York Application October 21, 1935, Serial No. 45,935

2 Claims. (Cl. 192—107)

This invention relates to friction clutches, such as are used in motor vehicles to transmit the power of the engine to the propeller shaft of the vehicle, and has for its object a clutch element, as a driven clutch element, having metal friction rings or facings, in contradistinction to fiber or woven molded fiber facings, and in addition, a particularly simple and economical means for retarding the conduction of heat generated at the friction faces of the clutch in the use thereof, to the body of the clutch or to the interior of the clutch, particularly in clutches, where the driven element embodies a vibration dampener interposed between the clutch element and the clutch shaft.

The invention consists in the novel features and in the combinations and constructions hereinafter set forth and claimed.

In describing this invention, reference is had to the accompanying drawings in which like characters designate corresponding parts in all the views.

Figure 1 is a sectional view of a single plate clutch embodying this invention.

Figures 2 and 3 are fragmentary elevations, partly broken away, of driven clutch elements.

Figure 4 is a fragmentary view illustrating one form of vibration dampener.

In dry plate clutches used in motor vehicles, one of the clutch elements, as the driven element, plate, or disk, has heretofore generally been provided with friction facings or facing disks or flat rings of a woven or molded fiber material. Metallic facing disks have not been used extensively, because of the heat generated and conducted to the interior of the clutch, during the operation of the clutch, especially during slippage, as when the clutch is let in, or is engaging. The internal heating of the clutch tends to deteriorate the action of the vibration dampener means interposed between the clutch element or clutch plate and the clutch shaft on which it is mounted. Heating, especially excessive heating, is also detrimental for other well known reasons. Therefore, the principal feature of this invention is the prevention or retardation of the conduction of heat generated during the use of the clutch with metal friction faces to the interior of the clutch driven plate.

I have here shown my invention, as embodied in a so-called single plate clutch.

I designates the clutch element, this being usually the driven clutch element. It consists of a discoidal metal body 2 usually formed of sheet metal and having a hub 3 slidably splined to the clutch shaft 4 and usually a vibration dampener means of any suitable construction interposed between the body or plate 2 and the hub 3. The vibration dampener is designated, as a whole, by the numeral 5. This may be of any of the well known or suitable vibration dampener constructions. They embody tempered or resilient spring parts, the heating of which results in deterioration of the dampener, so that they can not perform efficiently and function as a dampener, and oftentimes result in breakage and destruction.

6 designates the driving member of the clutch, which is usually the fly wheel of the engine of the vehicle, the fly wheel having a recess 7, the bottom 8 of which constitutes a clutch face with which the clutch element 1 coacts.

9 designates a pressure ring rotatable with the fly wheel and pressing against the clutch element 1 to press it against the clutch face 8 of the fly wheel 6. The clutch is thrown out by a suitable throw-out collar 10 operated in the usual manner by the clutch pedal, and, as here shown, is thrown in by a clutch spring means 11 through suitable clutch levers 12. However, the clutch may be thrown out or in in any well known manner.

14 and 15 designate metal friction facings for the plate 2. These may be of flat annular form or segments or in the general form of the woven molded fiber facings heretofore used in clutches as facings. They engage respectively with the bottom 8 of the recess and with the pressure ring 9.

In order to prevent the heat generated by these rings 14, 15 in the normal use of the clutch or in the abnormal slipping from being conducted to the disk or plate 2 and into the torque vibration dampener 5 or into the interior of the clutch, the facing disks 14, 15 are provided with backings of heat resisting material interposed between them and the disk or plate 2. The heat resisting means is here shown as annular flat rings 17 and 18 interposed between the metal friction facing rings 14 and 15, and the body 2, these being usually formed of an asbestos material. The facing rings or segments and also the heat retarding rings or segments are held assembled to the disk or plate 2 in any suitable manner, as by rivets 19. The heat generated by metal faced clutch members is very much greater than in clutches in which the facings are of woven molded fiber, which are, in themselves, heat resisting.

As the clutch member here shown coacts with both the fly wheel and the pressure ring, the plate 2 is provided with friction faces on opposite sides thereof. The rings 17, 18 also provide, to some extent, a somewhat yielding backing analogous to a gasket, for the metal facing rings 14 and 15, so that they can conform to slight variations in the clutch face 8 and in the face of the pressure ring 9 and to a slight extent equalize the pressure throughout the pressure area of the plate 2.

In Figure 2, the disk of the driven clutch element is shown as formed of segments which have metal facings.

In Figure 3, the disk of the clutch is shown as annular and undivided into segments and also the metal facing annular and undivided. In so far as this invention is concerned, it is immaterial whether or not the clutch disk or the facings are segmental. Metal clutch facings are highly desirable because they are long-lived. On the other hand, the heat generated is extremely high and detrimental, compared with the heat generated in clutches of woven fiber or molded fiber friction facings. The metal facings are sometimes referred to as bimetallic facings and consists of a metallic powder integrally bound to or brazed on a backing or a metallic alloy powder secured to a metal backing by compression and heat. The metallic facing per se forms no part of this invention.

By my invention, the metal friction facing disks can be used in clutches, particularly heavy clutches for trucks and the like, without liability of injuring crystallizing parts of the clutch on account of overheating.

What I claim is:

1. A motion transmitting element for friction clutches comprising a discoidal metal body plate, metal friction facings secured to opposite sides of the margin of the body plate, and heat resisting means interposed between the facings and the body plate for retarding conduction of heat generated in the facings to the body plate.

2. A friction clutch motion transmitting element comprising a discoidal sheet metal body plate, a hub at the center of the plate, metal friction facings on opposite sides of the margin of the sheet metal body plate, and heat resisting means interposed between the facings and the body plate for retarding the conduction of the heat generated in the facings to the body plate.

CHARLES B. SPASE.